United States Patent [19]

Buller-Colthurst

[11] Patent Number: 4,751,092
[45] Date of Patent: Jun. 14, 1988

[54] FOOD PROCESSING METHOD

[75] Inventor: Guy E. Buller-Colthurst, Erin, Canada

[73] Assignee: Knud Simonsen Industries Limited, Rexdale, Canada

[21] Appl. No.: 1,832

[22] Filed: Jan. 9, 1987

Related U.S. Application Data

[63] Continuation-in-part of Ser. No. 780,835, Sep. 27, 1985, Pat. No. 4,644,857.

[51] Int. Cl.$^4$ .......................... A23B 4/04; A23L 3/18; A23L 3/36
[52] U.S. Cl. .................................. 426/315; 426/509; 426/523; 426/524
[58] Field of Search ............... 426/233, 509, 520, 523, 426/315, 524; 99/355, 352, 443 C, 447, 477; 198/742; 17/44.4

[56] References Cited

U.S. PATENT DOCUMENTS

| | | | |
|---|---|---|---|
| 1,581,519 | 4/1926 | Robertson | 426/315 |
| 1,960,516 | 5/1934 | Taylor | 426/315 |
| 3,062,353 | 11/1962 | Opperthauser | 198/742 X |
| 3,276,352 | 10/1966 | Allen | 99/325 X |
| 3,301,374 | 1/1967 | Proctor | 198/742 |
| 3,343,477 | 9/1967 | Ekstam | 99/477 X |
| 3,518,934 | 7/1970 | Davis | 99/443 C |
| 3,702,583 | 11/1972 | Rullman | 99/443 C X |
| 3,718,082 | 2/1973 | Lipoma | 99/470 |
| 3,792,508 | 2/1974 | Simonsen et al. | 17/44.4 |
| 3,948,158 | 4/1976 | Borsuk | 99/443 C X |
| 3,982,300 | 9/1976 | Soikie et al. | 17/44.4 |
| 4,081,564 | 3/1978 | Borsuk | 99/443 C X |
| 4,136,608 | 1/1979 | Gladd | 99/335 X |
| 4,250,917 | 2/1981 | Jespersen et al. | 137/563 |
| 4,252,055 | 2/1981 | Johansson | 99/447 X |
| 4,271,957 | 6/1981 | Osborne | 198/742 X |
| 4,310,020 | 1/1982 | Jespersen et al. | 137/563 |
| 4,366,177 | 12/1982 | Wells et al. | 426/523 |

Primary Examiner—George Yeung
Attorney, Agent, or Firm—George A. Rolston

[57] ABSTRACT

A method of processing a first type of product and a second type of product in a common chamber, by passing of a first type of product into the chamber and causing it to dwell for a predetermined first dwell time, and then passing a batch of a second type of product into the chamber and causing it to dwell for a predetermined second dwell time different from the first dwell time.

9 Claims, 3 Drawing Sheets

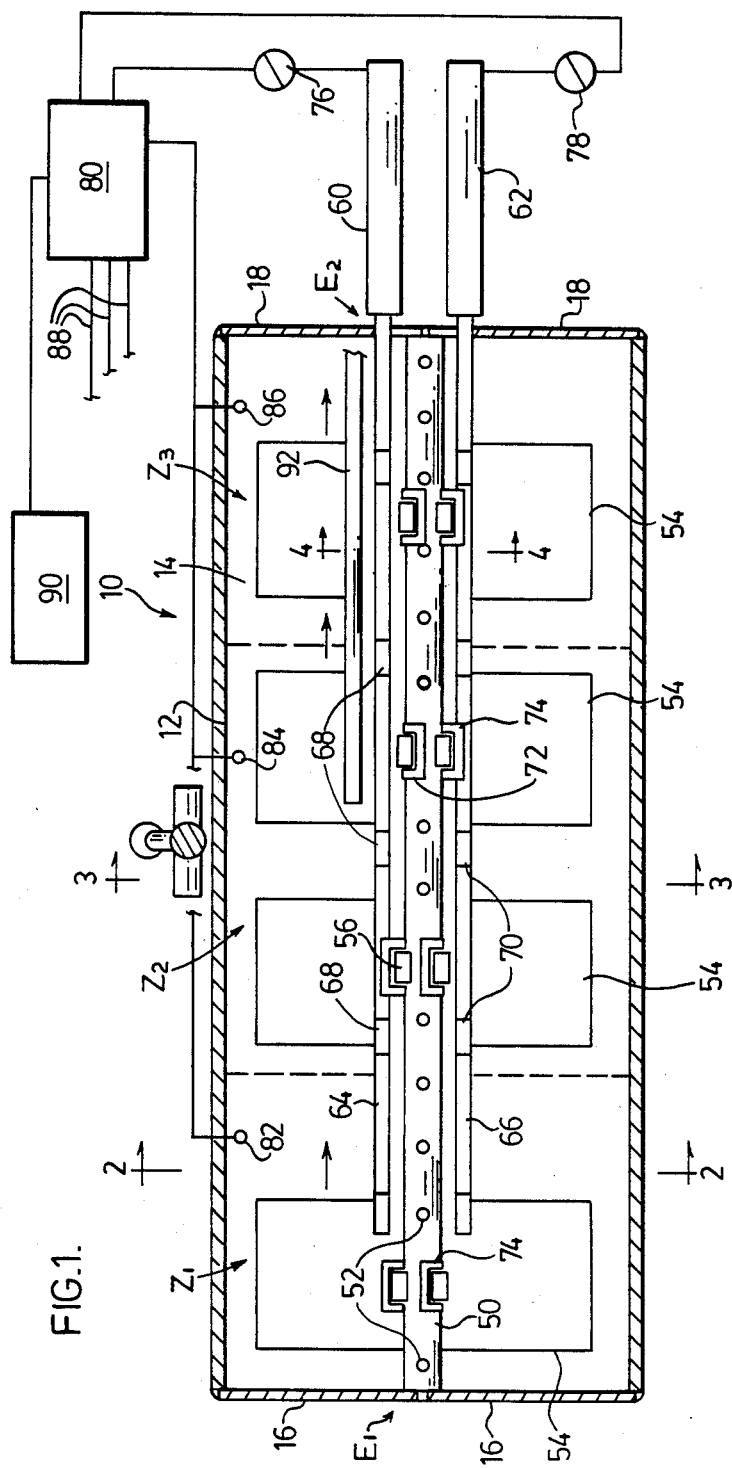

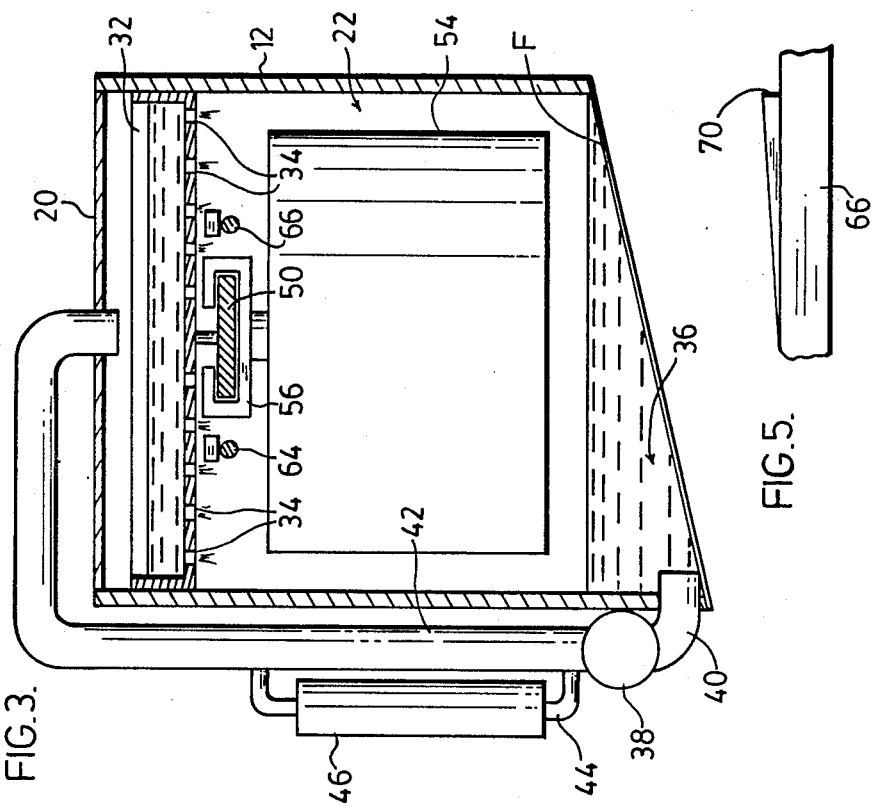
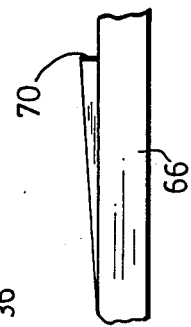
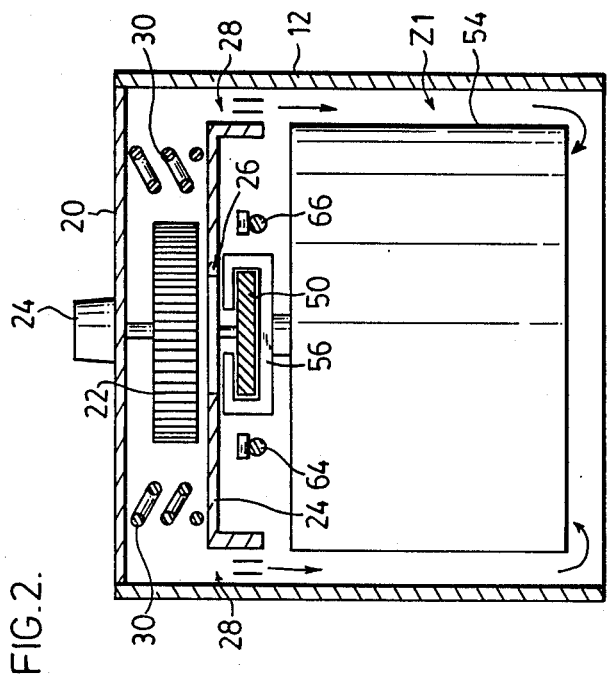
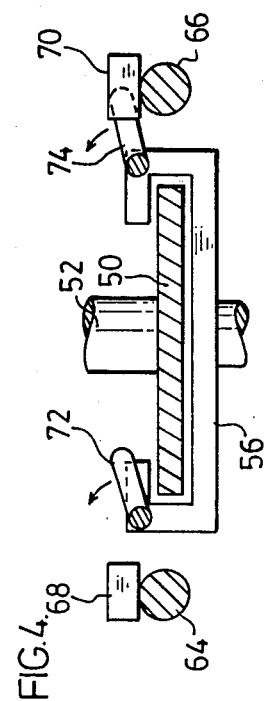

FOOD PROCESSING METHOD

The invention relates to a method of processing different products in a common chamber, and is a continuation-in-part application of application Ser. No. 780,835, filed Sept. 27, 1985, entitled FOOD PROCESSING CHAMBER, now U.S. Pat. No. 4,644,857.

BACKGROUND OF THE INVENTION

Processing chambers are known for processing food products, pottery, metal products, and the like under conditions established in such a chamber. Conveyors are used for conveying such products either continuously or in batches through such chambers. In many cases, it is desirable to establish a chamber with a series of different zones, in which different conditions exist.

This is particularly desirable in the processing of food products such as meat, poultry, and processed meat such as hams, picnics, pork bellies, luncheon meats and sausage.

In these cases, different zones may provide for air circulation, or water shower or water spray treatments. The air may be either at an elevated temperature or contain smoke or other treatments, or may be at reduced temperature for chilling. Similarly, the water shower may be at an elevated temperature for cooking, or at a reduced temperature for chilling.

The atmosphere in the chamber may be tempered or modified by regulating the humidity, or by adding artificial smoke.

In the past, it has been usual to provide such chambers in which the products were moved gradually and progressively and continuously through the various zones in the chamber by a continuously moving conveyor.

In these cases, however, it was necessary to operate the chamber at preset conditions in the various zones, and since the products were moving continuously through all the zones at the same speed, it was only possible to process one type of product at any given time.

In order to change products, it was necessary for the product already in the chamber to be completely processed all the way through which might take several hours, and then, when the chamber was empty, the conditions could be changed, or the speed of the conveyor could be changed, to suit a different product.

This type of installation involved a very substantial investment in capital. It was therefore suitable only for processing products in very large volumes.

It also produced a considerable degree of inflexibility in the use of the equipment. Clearly, it is desirable to provide a processing chamber at a lower capital cost which is capable of processing various different products, for different dwell times, and in which the conditions may be changed more readily, and more frequently.

One way in which this may be achieved is by providing a processing chamber in which the conveyor does not move continuously throughout the chamber, but in which it moves in a step-wise fashion, progressively moving individual batches or units of products through the chamber.

Since the batches or units of product will remain stationary, between the step-wise sequence of movement, the chamber can be made much shorter.

In this way, a substantial saving in capital cost is obtained.

However, it is still true that even with this modification, the chamber cannot be switched over from processing of one type of product to another until the first type of product has passed completely through the chamber.

Since this may take a considerable time, it means that a substantial delay may be created, by changing over from processing one product to the processing of another.

Accordingly, it is desirable, if possible, to provide for such a chamber in which there are two separate step-wise conveyor systems. In this way, a first batch or unit of product may be moved by one conveyor at a first speed and, as soon as a first zone of the chamber is free of such first batch of product, then a second batch of a different product may be moved into the first zone by a second conveyor, moving it in steps in a different sequence.

In this way, provided the two different products may be processed under the same processing conditions within the various zones, it is possible to process a first batch of one type of product followed by a second batch of another type of product, with very little down time in the use of the chamber itself.

Conversely where it is desired to change process conditions for a batch of different product, it is desirable to be able to change conditions in a first zone, and introduce a batch of a second product, while a batch, or batches of a first product are still being processed in a subsequent zone.

This means that with a lower capital cost, a small or medium sized processor, may process a variety of different types of product through the chamber, with a greatly reduced or minimized down time being created by the changeover from one product to another.

BRIEF SUMMARY OF THE INVENTION

With a view to overcoming these various problems, the invention therefore comprises a method of processing at least two separate product units comprising a first unit, and a second unit, in a single processing chamber means defining a plurality of zones and comprising the steps of:

establishing predetermined processing conditions in at least two zones of said chamber means;

introducing said first unit into a first one of said zones;

moving said first unit through said first and second zones along a predetermined path, whereby to produce dwelling of said first unit in said first and second zones for predetermined first time limits; and, introducing said second unit into said first zone while said first unit is still dwelling in said second zone, and moving said second unit along the same said conveyor path through said first and second zones whereby to procure dwelling of said second unit in said first zone for predetermined second time limits different from said first time limits and removing said first unit from said second zone at completion of processing thereof, and subsequently removing said second unit from said second zone at completion of processing thereof.

More particularly, it is an objective of the invention to provide such a processing method, wherein there are at least two zones in the chamber, and including the steps of establishing predetermined different processing conditions in each said zone.

More particularly, it is an objective of the invention to provide such a processing method, wherein the chamber has first and second movement means and including the step of moving a first unit with one said movement means, and the second unit with the other movement means.

It is a further and related objective of the invention to provide such a processing method wherein at least one of said zones is provided with a water processing system and including the step of causing water to stream downwardly throughout the area of said zone of said chamber thereby processing units as they dwell in said zone.

It is a further objective of the invention to provide a method of processing separate batches of different products in separate zones of the chamber under different conditions simultaneously.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

FIG. 1 is a schematic top plan view of a processing chamber according to the invention, shown with the roof portion cut-away;

FIG. 2 is a schematic sectional elevation along the line 2—2 of FIG. 1, showing a first said zone with the roof portion intact;

FIG. 3 is a schematic sectional elevation corresponding to FIG. 2, along the line 3—3 of FIG. 1;

FIG. 4 is a greatly enlarged section along the line 4—4 of FIG. 1;

FIG. 5 is a side elevation of a portion of a puller rod; and,

DESCRIPTION OF A SPECIFIC EMBODIMENT

Figure 6:
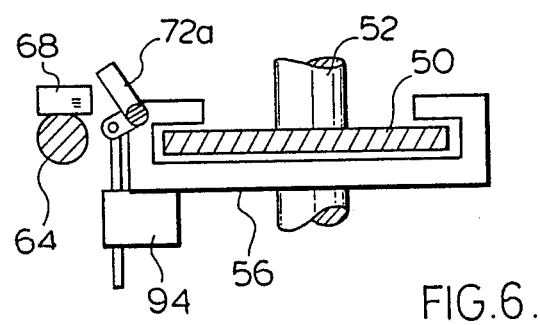
FIG. 6 shows an alternate embodiment.

Processing chambers described for use in the method of the invention may be used for processing a variety of different products and goods. For example, many different food products are processed in such chambers, and non-food products such as metal products, earthenware products, and the like may also be processed in chambers in accordance with the invention.

It will of course be understood that the processing conditions in the various zones of the chamber will be determined by the nature of the goods to be treated. Goods may be baked, cured, dried, tempered, smoked, and chilled, to give a few examples of the different types of processing conditions that may be used for different types of goods.

In the particular case of the embodiment as illustrated and described herein however, the chamber is designed for the processing of meat and poultry products for the processed meat trade.

All of these products are collectively described as "meat products". Examples of these products are sausage of various kinds, hams, picnics, briskets, pork bellies, turkey and chicken rolls, pigs trotters. Various kinds of processed fish such as smoked fish may also be processed in this way.

Some of these products are processed simply by storing them in certain conditions of temperature and humidity for a certain length of time such as, for example, twenty-four hours. This type of storing process is used in the treatment of typical uncooked sausage such as salami.

Other products are processed simply by a cooking stage followed by a chilling stage.

Some products are processed by first of all smoking, then cooking, and then chilling. Other products may be processed simply by smoking without any cooking, or simply by chilling alone in some cases.

Fruit products may also be processed by simply drying them, without cooking or chilling.

Accordingly, therefore, reference will be made generally to food products as having reference to meat, fish and other products any of which may be processed.

It is also of particular interest that in the present invention, the food products are processed in batches. This means that a large quantity of the products may be assembled together and placed on a series of shelves or hooks or hangers, all of which form part of a single unit. Such a unit may be supported on trolley wheels, on an overhead conveyor rail. Alternatively, it may stand on a set of wheels running on rails on the floor.

For the purposes of this description, therefore, when reference is made to a "unit" it refers to a single product or a number of products, assembled on a suitable support of whatever type may be designed or desired, and which is passed through the chamber as a single collective unit.

This type of processing has several significant advantages over earlier forms of processing methods. In many earlier forms of processing, an elongated length of tunnel-like structure was built, having a conveyor system passing through it which was moving continuously. The conveyor system was provided with hooks at spaced intervals, and individual products or quantities of products were hung from each hook, and moved continuously through the chamber.

Since in order to satisfactorily process any particular product it is necessary that it remain (dwell) in certain predetermined temperature (or other) conditions for a certain length of time, then either the conveyor was run extremely slowly, or else the chamber tunnel would have to be made of very great length. In addition to these obvious disadvantages of the prior art, however, the prior art type of system led to inherent restrictions in the type of products that could be processed.

In many cases the processor will wish to process one type of product for say a first shift of the day, and then switch over to a second type of product during a second shift. The two products may require different processing conditions or different dwell times, or both.

In the continuous conveyor type of tunnel chamber, it was necessary to wait until the entire conveyor line was emptied of the first type of products before the conditions in the tunnel could be changed and the new product introduced.

This led to considerable down time, and rendered any changeover extremely expensive and wasteful.

A further disadvantage which was often encountered in some designs of tunnel-like chamber was the difficulty of maintaining strict tolerances on the processing conditions. Since each zone of the tunnel was of great length, it would be necessary to provide numerous sensing devices throughout the length of each zone, and to provide a large amount of specially designed equipment to maintain the conditions at the present level throughout the length of the zone.

It has now been found that all of these problems can be substantially reduced if not completely eliminated by adopting the batch process, rather than the continuously moving product line.

In a batch process such as that about to be described herein, a batch of product can be introduced into a zone and then simply left stationary or moved intermittently during its processing time or dwell time in that zone. during its processing time in that zone. Once that time is up, that batch can then be moved to the next zone and then simply left to stand in the next zone and so This means that the overall chamber structure can be made much shorter and can have greater cross-sectional dimensions. Each batch or unit of product can be assembled as a unit on a single support of considerable size. All products in that batch will be processed simultaneously in absolutely identical conditions, leading to much greater uniformity in the quality of the end product.

Since the zones are more compact, the processing conditions can be maintained to closer tolerances, and the design of the equipment in each zone can be made much more efficient.

Since any one batch or unit of product will be removed from one zone, and placed in another as a single unit, and since the supporting devices for the batches are separate and unconnected with one another, this means that it is much easier to change over from a first type of product to a second type, while the first type of product is still in the chamber.

Much greater flexibility and more efficient operation are achieved, with a much smaller capital investment.

Referring now to FIG. 1, a chamber for the process according to the invention is illustrated schematically as 10. The chamber has three zones indicated as Z1, Z2 and Z3, and product moves from left to right, from the point marked E1, indicating the entry to the point E2, indicating the exit.

The chamber 10 is formed with continuous side walls 12, a floor 14, entry doors 16 and exit doors 18. Typically, the walls 12 would be insulated and the doors 16 and 18 would normally be insulated as well, and the doors would of course be movable to open and close in any suitable manner either by hinging or by sliding.

Alternatively, in some designs it may be possible to utilize air curtain doors of known design (not shown for the sake of clarity) to replace the doors 16 and 18.

Referring to FIGS. 2 and 3, a continuous roof 20 is shown, and attached beneath the roof 20, processing condition apparatus is located which of course will vary from zone to zone and from process to process.

Thus in FIG. 2, the processing condition equipment in zone Z1 will be seen to comprise a fan 22 driven by a motor 24, and operating adjacent to a baffle or false ceiling 25. The ceiling 25 has a central opening 26, and defines side openings 28—28, which may be provided with suitable air director blades or the like of known design.

Air driven by fan 22 will exit through side openings 28, and pass downwardly through the zone and return upwardly through the central opening 26, in a continuous recirculating path.

In this way, the entire zone can be continuously and entirely ventilated.

Typically the air in the zone will be treated in some way, or tempered, by tempering units 30. The tempering units 30 may heat the air, chill the air, or may control the humidity either by raising it or lowering it, or may introduce various kinds of artificial smoke for flavouring the product.

The details of such tempering units are well known in the art and require no further description.

In the present case they will typically represent smoke generators, for introducing artificial smoke into the air circulating, for the purpose of establishing a smoking and curing atmosphere in zone Z1.

As explained above, however, the tempering units 30 could be of such a type that they provide different atmospheres in zone Z1, and are therefore shown here purely as a schematic illustration and without limitation.

As shown in FIG. 3, zone Z2 is shown, merely by way of illustration, and without limitation, as being provided with a hot water treatment system comprising a header tank 32, arranged beneath the roof 20, and provided with a plurality of drain holes 34. The zone Z2 has a floor indicated as F which is formed with a slope, so as to provide a collector well 36.

A recirculating pump 38 is connected by means of pipes 40 to well 36. The output from the pump 38 supplies main pipe 42 and branch pipe 44. Main pipe 42 leads back through roof 20 to supply water to header tank 32. Branch pipe 44 passes a proportion of the water through a heat exchanger 46 which may heat, or chill, the water. In this way, a constant flow of water, in this case hot water at an elevated temperature, is supplied to tank 32 and will then pour or stream downwardly through the multiple openings 34 throughout the region of zone Z2 and collect again in well 36.

This so-called water processing system therefore enables a processor to subject products in zones Z2 to heating or chilling, depending upon the type of process and the type of product.

As a cooking or heating or chilling medium for food products such as processed meats a liquid medium such as water is particularly advantageous. The use of a massive recirculating system such as this with a relatively low pressure, high volume pump 38, provides for a highly efficient method of processing food products. In particular, the very high volume of water flowing continuously through the zone Z2 ensures that all of the products are raised or chilled to the same temperature almost simultaneously, and with a very high degree of temperature control throughout all the products within zone Z2. In fact, it is possible to ensure that there will be a temperature drop (or rise) in the water temperature between the top of the zone Z2 and the bottom of not more than 1 degree.

While zone Z2 is described as a "hot" water zone, for cooking, it could equally well employ chilled water, and zone Z2 would then chill the product in a highly efficient manner.

The zone Z3, which is not specifically illustrated in section, may be provided with either an air circulating system such as shown in FIG. 2, or a water circulating system such as shown in FIG. 3, for the purpose of typically chilling products. However, if some other form of processing is required in zone Z3, then it may be provided with an entirely different system for establishing a predetermined zone condition.

In any event, the details of such zone conditioning apparatus are not disclosed, since they may vary widely, and are known to persons skilled in the art.

While three zones are illustrated, the number may vary depending upon the processing conditions, product type and the like.

In order to move batches, or units of products through the zones, a step-wise or batch conveyor system is provided.

Such a conveyor system in this embodiment comprises a single continuous overhead rail 50, suspended in any suitable manner centrally in the upper regions of chamber 10, by means such as posts 52.

However, other forms of movement means are known in the art and the invention is not restricted solely to a step-wise movement means.

The product supports are illustrated merely as cubes 54. In practice, however, these supports will typically be a system of hooks or shelves or racks or the like on which products ready for processing may be supported.

Typically, the supports will be in the form of a cage of rods or bars or the like, and in many cases the products may be first of all arranged in groups or lengths on other supporting devices which are then attached or hooked onto the support device 54. Various different forms of supporting means may be used for supporting products. In the particular case of food products such as linked sausage for example, a typical supporting device is shown in U.S. Pat. No. 3,594,858.

The use of such product hangers or supports enables products such as sausage to be assembled from a sausage stuffing machine in loops, of a weight which can be conveniently handled and each hanger with loops of sausage arranged on it would then be placed on suitable hooks in the supporting device 54.

It will of course be appreciated, however, that the use of such individual hangers or rods is in no way limiting. Any means can be provided for supporting a wide variety of different products.

The product support 54 will be provided with any suitable form of trolley means such as the trolley 56, which may be, for example, slide over the ends of the rail 50. Typically it will be provided with some form of antifriction means such as wheels or the like (not shown) so that it may slide relatively easily along the rail.

In order to move the loaded support 54 along the rail 50, two separate movement systems are provided.

Both movement systems in this embodiment are shown as having the same construction, although this would not necessarily be the case in every installation.

In the present embodiment therefore the two movement systems will be seen to comprise the air cylinders 60 and 62 mounted side-by-side at the downstream or exit end E2 of the chamber 10. Each cylinder 60 and 62 has an elongated pull rod 64, 66. The pull rod 64 of cylinder 60 is connected to a piston (not shown) in cylinder 60 so that operation of cylinder 60 will cause the pull rod 64 to reciprocate one way or the other, and the same is true of pull rod 66 and cylinder 62.

The pull rods 64 and 66 extend throughout almost the entire length of the chamber 10, and are arranged parallel side-by-side with one another on opposite sides of the conveyor rail 50.

Each of the pull rods 64 and 66 is provided with some form of selectively operable interengagement means, for engaging the trolleys 56, or supports 54. In this embodiment it is illustrated as a series of abutment blocks 68, 70. They are formed, in this embodiment, in a generally wedge shape (FIG. 5), to provide a ramp surface, and are located at spaced intervals along the length of each of pull rods 64 and 66.

Each of the trolleys 56 of the support units 54 are provided with movable latching members 72 and 74, which are swingably mounted on the trolleys 56 and may be swung from left to right (FIG. 4).

The latching members may be linked together by means not shown to swing in unison.

The swinging movement of the latching means 72 and 74 is such that they will rest on either of rods 68 or 70 in a slightly upwardly angled position.

This is merely one form of interengagement between the trollies, and the puller rods. Other forms of interengagement devices could be provided which may, or may not, provide a movable type of interengagement. For example, the trolleys 56 could be fabricated in two different designs, one to be engaged on one side and the other on the other side.

Any suitable bearing or support means not shown may be provided at intervals along rods 64, 66 so as to ensure that they remain in position adjacent the trolleys 56.

Cylinders 60 and 62 are controlled by valves 76, 78 and controller 80. Controller 80 will typically also be linked to zone sensors 82, 84 and 86, for sensing the conditions in the zones.

Controller 80 will also typically be linked to the zone conditioning units, by leads 88. Controller 80 will be supplied with initial information by input console 90.

The details of the controller 80, and zone sensors, condition controls and console are omitted for the sake of clarity, and may vary widely from one unit to another and are in any event well known to persons skilled in the art.

A further puller rod 92, and cylinder (not shown) may be provided for engaging supports 54 in the downstream zones 22, 23, etc. This enables the operator to effect a changeover somewhat more expeditiously.

The engagement means and cylinder are omitted for the sake of clarity.

In operation, assuming it is desired to, for example, process a first type of food product such as one type of sausage for a first shift, and then change over to a second type of product such as, for example, a luncheon meat for another shift, then the necessary program information for the first product is input at console 90 into controller 80, and the zone conditions in the zones Z1, Z2 and Z3 are established and stabilized.

The first food product is then loaded onto a unit support 54, which is then placed on the rail 50 at the zone entry E1. The loaded support 54 is then pushed into zone Z1 or may simply be pulled in by the operation of the cylinder 60 in the manner described below.

As soon as the batch support 54 has been introduced into the zone Z1, the doors 16 are closed and the operator signals to the controller 80 that processing has commenced on the first batch.

It is assumed for the purposes of this discussion that at the introduction of the first batch support 54, the latches 72, 74 have been swung to the right as shown in FIG. 4.

As a result of its programmed information, the controller 80 will then operate valve 78 to cause cylinder 62 to cycle at a certain cycle program, for example a certain number of cycles per hour.

This may be one cycle per hour or two for example. Once the batch support 54 has been stationed in the first zone Z1 the appropriate length of time, the cylinder 62 is then cycled once. This causes the pull rod 66 to be extended and then retracted.

Upon the extension of the pull rod 66, the abutment 70 will move underneath the latch 74. The latch 74 will simply slide up over the ramp of the abutment 70 and then drop down again.

The rod 66 will then be retracted, and this will then cause the first batch support 54 to move the length of one cycle of the rod 66.

Again, depending upon the variables of the processing required, it may be desired to move the batch 54 completely out of the zone Z1 at that point and have it introduced into zone Z2. This may, for example, require two cycles of the rod 66, and its cylinder 62 before the batch 54 has moved from the zone Z1 to the zone Z2.

Alternatively, the program may be such that a longer dwell time is required in zone Z1 in which case the program will call for a single cycle of the rod 66, which will then merely cause the batch support 54 to move from the first position to a second position within zone Z1.

Again, it will be apparent that there are many variables to be considered including the length of the zones, the size of the batches, the program for the processing conditions for the particular type of product, and even the engineering of the entire installation including the length of the cylinders 60 and 62.

In any event, however, once the first unit support 54 has been moved, the second unit support loaded with, for example, the same type of product can then be introduced once more by simply opening the doors 16 and placing its trolley 56 on the rail 50.

Again, assuming the type of product is the same as the previous batch, then the latches 72,74 will be swung to the same side.

As each fresh loaded batch support 54 is hooked onto the rail, assuming the products are all identical and require identical processing conditions and dwell times, then all of the latches 72,74 will be swung to the same side.

When it is desired to process a second type of product requiring different processing dwell times, or different processing conditions within the zones, or both, then the next batch support 54 loaded with the second type of product is raised and attached on the rail 50, but in this case the latches 72,74 are swung to the left.

This will bring them into juxtaposition with the rod 64, operated by the cylinder 60. By inputting the appropriate program information through console 90, the controller 80 will then, through valve 76, cycle cylinder 60 at the appropriate time.

In this way, while the batches of or units of the first type of product are gradually clearing from the chamber 10, batches or units of the second type of product can be introduced, with a minimum of down time and delay.

Obviously, in some cases it will be necessary to allow a somewhat larger space along the rail 50 between the last batch of the first type of product and the first batch of the second type of product, and in other cases little or no spacing will be required.

For example, where the second type of product requires different processing conditions, then conditions in one mor more of the zones must be changed. This will involve allowing all of the first type of product to move out of the zone to be changed. The new process conditions will have been input into the controller. There will then be a certain delay while the new conditions are stabilized.

The batches, or units, of the second type of product can then be introduced and processed under the new conditions.

It will thus be seen that by the practice of the invention, products of two different types may be processed in the same overall chamber facility, while carried on the same single conveyor line, under different processing conditions, or dwell times, or both, within the various zones of the chamber.

It will of course be appreciated that while the invention is illustrated as showing an overhead conveyor rail and suspended product supports 54, the invention is equally applicable to a system of floor rails (not shown) and product supports mounted on wheels which run on such rails.

In this case, of course, the two conveyor systems would be moved and operate at a different location, but the invention would be equally applicable to this type of operation.

While zone Z1 is shown as having an air circulation system and zone Z2 is shown with a water system, the invention is not limited only to these systems, nor to this configuration of systems. Two, three or more zones could all have air, or water systems, or a combination of systems in any order.

Conceivably any one zone can be engineered to incorporate both air and water or other systems, to be used selectively for greater flexibility.

Other conditioning systems such as steam systems, radiant systems, ultra violet treatments and the like may be provided for special applications.

While reference has been made herein to two movement means, it will be appreciated that this is merely one way in which the objectives of the invention can be achieved.

Any means whereby different batches of product can be selectively moved in the chamber at different timings may be used without departing from the invention. Thus for example, the latching devices 72 and 74 may be provided with some form of electrical or mechanical operation and controller.

In this way, the latches could be raised out of engagement, and then lowered into position only when it was required for that particular batch of product to move.

In this way, one of the cylinders 60 or 62 and its associated puller rod could be dispensed with altogether. At the same time, one or other of the latches 72-74 could also be dispensed with.

A general arrangement of such a system is shown in FIG. 6. In this illustration, it will be seen that there is only one puller rod 64, and cylinder 60, and one latch 72a. The latch 72a is operated by a remote controlled electrical operator box 94, which may be operated under the control of controller 80, to swing the latching device 72a to and fro into and out of engagement with the ramp 68 on rod 64.

Alternatively, the operating box 94 may be operated by air controls, or magnetic impulses.

It will thus be appreciated that the invention is not restricted solely to the use of two separate movement means.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A method of processing product units of at least two different types of product comprising at least a first unit of a first type of product, and a second unit of a second type of product, in a single processing chamber means defining a plurality of zones and comprising the steps of:

establishing predetermined processing conditions in said at least two zones of said chamber means;

introducing said first unit into a first one of said zones;

moving said first unit through the first and second zones of said chamber means along a predetermined conveyor path, whereby to procure dwelling of said first unit in said first and second zones for predetermined first time limits;

introducing said second unit into said first zone while said first unit is still dwelling in said second zone, and, moving said second unit along the same said conveyor path whereby to procure dwelling of said second unit in said first and second zones for predetermined second time limits different from said first time limits and removing said first unit from said second zone at completion of processing thereof, and subsequently removing said second unit from said second zone at completion of processing thereof.

2. A method of processing product units as claimed in claim 1 including the steps of establishing water shower processing conditions at a predetermined temperature in at least one of said zones of said chamber means.

3. A method of processing product units as claimed in claim 1 including the steps of providing a continuous movement means alongside said conveyor path, and moving same in predetermined timed steps, and selectively interengaging one of said units with said movement means at timed intervals, to procure movement of said one of said units and dwelling of same, at timed intervals.

4. A method of processing product units as claimed in claim 1 including the steps of clearing said first unit from said first zone, changing said process conditions in said first zone, and introducing said second unit into said first zone.

5. A method of processing product units as claimed in claim 1 wherein there are at least three said zones, and wherein said units are processed in a first one of said zones by smoke, and wherein said units are processed in a second one of said zones by water shower processing at an elevated temperature, and wherein said units are processed in a third one of said zones by chilling.

6. A method of processing product units as claimed in claim 2, wherein said temperature is elevated, for cooking said product units.

7. A method of processing product units as claimed in claim 2, wherein said temperature is reduced, for chilling said product units.

8. A method of processing product units as claimed in claim 1, wherein said units are moved by respective first and second conveyor means and including the steps of moving said first unit by said first conveyor means, and moving said second unit by said second conveyor means.

9. A method of processing product units as claimed in claim 1 wherein a single conveyor means moves both said first and second product units, and including the step of selectively interengaging and disengaging said first and second product units with said conveyor means to procure said predetermined dwell times of said first and second product units in said first and second zones.

* * * * *